(12) United States Patent
Lo

(10) Patent No.: US 7,885,192 B1
(45) Date of Patent: *Feb. 8, 2011

(54) GENERALIZED AUTO MEDIA SELECTOR

(75) Inventor: William Lo, Cupertino, CA (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 12/619,761

(22) Filed: Nov. 17, 2009

Related U.S. Application Data

(63) Continuation of application No. 11/201,111, filed on Aug. 10, 2005, now Pat. No. 7,619,975.

(60) Provisional application No. 60/667,731, filed on Apr. 1, 2005.

(51) Int. Cl.
*G01R 31/06* (2006.01)

(52) U.S. Cl. .................. 370/235; 370/360; 370/384; 370/469

(58) Field of Classification Search .......... 370/235, 370/360, 384, 469
See application file for complete search history.

(56) References Cited

U.S. PATENT DOCUMENTS

| | | | |
|---|---|---|---|
| 5,610,903 | A | 3/1997 | Crayford |
| 5,737,108 | A | 4/1998 | Bunch et al. |
| 5,922,052 | A | 7/1999 | Heaton |
| 5,936,962 | A | 8/1999 | Haddock et al. |
| 6,072,803 | A | 6/2000 | Allmond et al. |
| 6,073,006 | A | 6/2000 | Sawyer et al. |
| 6,154,464 | A | 11/2000 | Feuerstraeter et al. |
| 6,215,816 | B1 | 4/2001 | Gillespie et al. |
| 6,259,745 | B1 | 7/2001 | Chan |
| 6,272,173 | B1 | 8/2001 | Hatamian |
| 6,275,501 | B1 | 8/2001 | Lucas et al. |
| 6,285,659 | B1 | 9/2001 | Feuerstraeter et al. |
| 6,385,738 | B1 | 5/2002 | Lo |

(Continued)

FOREIGN PATENT DOCUMENTS

EP     0 986 217 A1     3/2000

(Continued)

OTHER PUBLICATIONS

ANSI/IEEE Std. 802.3, 2000 Edition; Part 3: Carrier Sense Multiple Access With Collision Detection (CSMA/CD) Access Method And Physical Layer Specifications, Parts 1, 2 & 3.

(Continued)

*Primary Examiner*—Seema S Rao
*Assistant Examiner*—Sai-Ming Chan

(57) ABSTRACT

A media selection system includes a plurality of media ports. Each of the plurality of media ports is coupled to a corresponding physical medium, is configured to generate an activity signal, and is configured to generate a link status signal. A priority storage module is configured to contain priority information, which sets forth a priority for establishing a link through each of the plurality of media ports. A media selector module is configured to select a first media port through which a link will be maintained based on the activity signal generated by each of the plurality of media ports. The media selector module is configured to link the signal generated by each of the plurality of media ports and the priority information. The media selector module is configured to block all other links through media ports of the plurality of media ports other than the first media port.

12 Claims, 5 Drawing Sheets

U.S. PATENT DOCUMENTS

| | | |
|---|---|---|
| 6,389,005 B1 | 5/2002 | Cruickshank |
| 6,389,480 B1 | 5/2002 | Kotzur et al. |
| 7,012,897 B1 | 3/2006 | Sowizral et al. |
| 7,023,873 B2 | 4/2006 | Gibson et al. |
| 7,054,309 B1 | 5/2006 | Hoot et al. |
| 7,230,957 B2 | 6/2007 | Kang et al. |
| 7,283,481 B2 | 10/2007 | Huff |
| 7,324,507 B1 | 1/2008 | Lo et al. |
| 7,450,543 B2 | 11/2008 | Laroia et al. |
| 7,599,391 B1 | 10/2009 | Lo |
| 2003/0179709 A1 | 9/2003 | Huff |
| 2003/0179711 A1* | 9/2003 | Huff ............... 370/248 |
| 2003/0217215 A1* | 11/2003 | Taborek et al. ......... 710/305 |
| 2004/0022238 A1 | 2/2004 | Kimmitt |
| 2010/0141466 A1* | 6/2010 | Nguyen et al. ........... 340/687 |

FOREIGN PATENT DOCUMENTS

| | | |
|---|---|---|
| EP | 0 986 217 A2 | 3/2000 |

OTHER PUBLICATIONS

IEEE Standard 802.3, Local and Metropolitan Area Networks: Physical Layer Link Signaling for 10 Mb/s, and 1000 Mb/s Auto-Negotiation on Twisted Pair, 2000 Edition, pp. 698-745; and pp. 1009-1033.

IEEE, Std. 802.3, 2000 Edition, Local and Metropolitan Area Networks: Sections 28-38, pp. 698-1033.

* cited by examiner

GENERALIZED AUTO MEDIA SELECTOR

CROSS-REFERENCE TO RELATED APPLICATIONS

This application is a continuation of U.S. patent application Ser. No. 11/201,111, filed Aug. 10, 2005, which claims the benefit of U.S. Provisional Application No. 60/667,731, filed on Apr. 1, 2005. The disclosures of the above applications are hereby incorporated by reference herein in their entirety. U.S. patent application Ser. No. 11/201,111, filed Aug. 10, 2005, is a continuation-in-part of U.S. patent application Ser. No. 10/435,301 (now U.S. Pat. No. 7,324,507), filed on May 9, 2003, which is a continuation-in-part of U.S. patent application Ser. No. 09/991,046 (now U.S. Pat. No. 7,054,309), filed Nov. 21, 2001 and claims the benefit of U.S. Provisional Application No. 60/438,933, filed on Jan. 9, 2003.

FIELD OF THE INVENTION

The present invention relates to computer networks, and more particularly to an automatic media selector.

BACKGROUND OF THE INVENTION

Referring now to FIG. 1, a data link layer 10 of the open systems interconnection (OSI) model includes a logical link control (LLC) layer 12 and a media access control (MAC) layer 14. The LLC layer 12 addresses and exchanges data with a network layer 16. The MAC layer 14 provides an interface between the LLC layer 12 and a physical layer device 18. The MAC layer 14 frames data for transmission over the network and then passes the frame to the physical layer device 18 for transmission as a stream of bits. In other words, the MAC layer frames data into distinct units or packets that are transmitted one at a time over the network.

The physical layer device 18 typically includes a physical coding sublayer (PCS) 20, a physical medium attachment (PMA) sublayer 22, and an autonegotiation sublayer 24. A medium dependent interface (MDI) 26 connects the physical layer device 18 to media 28 such as twisted pair wires, optical fiber, or other media. The IEEE 802.3 specification, which is hereby incorporated by reference in its entirety, further defines how physical network interfaces operate with different types of media such as coaxial cable, twisted-pair cable, and optical fiber.

The autonegotiation sublayer 24 initiates the exchange of information between two connected network devices and automatically configures the devices to take maximum advantage of their respective abilities. The autonegotiation sublayer 24 advertises the abilities of the network device, acknowledges receipt, identifies common modes of operation, and rejects the use of operational modes that are not shared or supported by both devices. When more than one common mode of operation exists between the devices, an arbitration function of the autonegotiation layer 24 identifies and selects a single mode of operation. After autonegotiation is complete, the devices establish a link and exchange data.

To improve flexibility, the physical layer device 18 of some network devices has been designed to be connected to different types or speeds of media. Alternatively, multiple physical layer devices may be present to handle different types or speeds of media. The manufacturer and/or the user may not know a priori the types or speeds of media that will be used, and the media used may change over time.

SUMMARY OF THE INVENTION

A network media selection system comprises a memory that stores priority information for each of a plurality of ports and a media selector module that communicates with the memory, that receives activity signals and link signals from the plurality of ports, and that uses the activity signals, the link signals, and the priority information to generate enable signals for the plurality of ports. A respective port attempts to establish a link when a corresponding one of the enable signals is in a first state, and the respective port detects physical layer activity when a corresponding one of the enable signals is in a second state. The media selector module selectively sets enable signals to the second state for all of the plurality of ports other than a target port, which has the highest priority and has generated a link signal.

In other features, the priority information associates each of the plurality of ports with a unique priority level. The media selector module sets an enable signal for a senior port to the first state if the senior port has a higher priority than the target port and generates an activity signal. The media selector module sets enable signals to the second state for all of the plurality of ports other than the senior port and the target port when the senior port enable signal is in the first state. The media selector module sets enable signals to the second state for all of the plurality of ports other than the senior port when the senior port enable signal is in the first state.

In still other features, the media selector module sets enable signals to the first state for all of the plurality of ports a predetermined period after the senior port enable signal is set to the first state. The predetermined period is based upon a period required for a link to be established on physical media associated with the senior port, a period typically required for a link to be established on physical media associated with the senior port, and/or a maximum expected period required for a link to be established on physical media associated with the senior port.

In further features, the media selector module sets enable signals to the second state for all of the plurality of ports except for the target port when the media selector module receives a link signal from the target port. The media selector module sets enable signals to the second state for all of the plurality of ports except for the target port a predetermined period after receiving a link signal from the target port. The predetermined period is based upon a period required for a link to be established on physical media associated with one of the plurality of ports, upon a typical period required for a link to be established on physical media associated with a port corresponding to a highest priority level, and/or upon a maximum expected period required for a link to be established on physical media associated with a port corresponding to a highest priority level.

A physical layer device comprises the network media selection system and further comprises a plurality of ports that communicate with the media selector module and that each communicate with a physical media. Each of the plurality of ports monitors the physical media corresponding to the port for activity. Each of the plurality of ports attempts to establish a link over physical media corresponding to the port when a corresponding one of the enable signals is in a first state. Each of the plurality of ports operates in a low power mode when monitoring physical energy.

A network media selection system comprises memory means for storing priority information for each of a plurality of ports and media selecting means for communicating with the memory, receiving activity signals and link signals from the plurality of ports, and generating enable signals for the plurality of ports using the activity signals, the link signals, and the priority information, wherein a respective port attempts to establish a link when a corresponding one of the enable signals is in a first state, and the respective port detects physical layer activity when a corresponding one of the enable signals is in a second state, and wherein the media selecting means selectively sets enable signals to the second state for all of the plurality of ports other than a target port, which has the highest priority and has generated a link signal.

In other features, the priority information associates each of the plurality of ports with a unique priority level. The media selecting means sets an enable signal for a senior port to the first state if the senior port has a higher priority than the target port and generates an activity signal. The media selecting means sets enable signals to the second state for all of the plurality of ports other than the senior port and the target port when the senior port enable signal is in the first state. The media selecting means sets enable signals to the second state for all of the plurality of ports other than the senior port when the senior port enable signal is in the first state.

In still other features, the media selecting means sets enable signals to the first state for all of the plurality of ports a predetermined period after the senior port enable signal is set to the first state. The predetermined period is based upon a period required for a link to be established on physical media associated with the senior port, upon a period typically required for a link to be established on physical media associated with the senior port, and/or upon a maximum expected period required for a link to be established on physical media associated with the senior port. The media selecting means sets enable signals to the second state for all of the plurality of ports except for the target port when the media selecting means receives a link signal from the target port.

In other features, the media selecting means sets enable signals to the second state for all of the plurality of ports except for the target port a predetermined period after receiving a link signal from the target port, upon a period required for a link to be established on physical media associated with one of the plurality of ports, upon a typical period required for a link to be established on physical media associated with a port corresponding to a highest priority level, and/or upon a maximum expected period required for a link to be established on physical media associated with a port corresponding to a highest priority level.

A physical layer device comprises the network media selection system and further comprises a plurality of ports that communicate with the media selecting means and that each communicate with a physical media. Each of the plurality of ports monitors the physical media corresponding to the port for activity. Each of the plurality of ports attempts to establish a link over physical media corresponding to the port when a corresponding one of the enable signals is in a first state. Each of the plurality of ports operates in a low power mode when monitoring physical energy.

In still other features, the methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided after. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
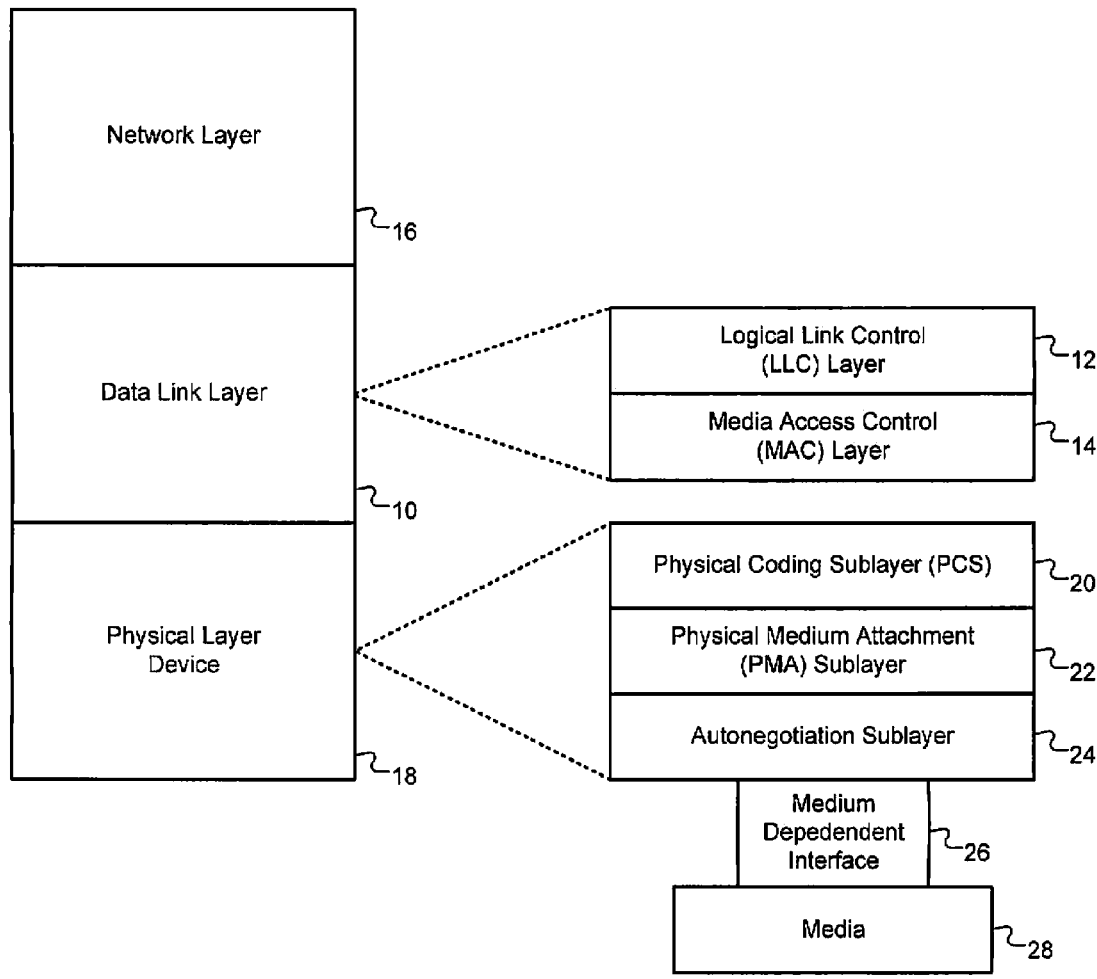
FIG. 1 is a diagram of the open systems interconnection (OSI) model.

The following description of the preferred embodiments is merely exemplary in nature and is in no way intended to limit the invention, its application, or uses. For purposes of clarity, the same reference numbers will be used in the drawings to identify similar elements. As used, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 2:
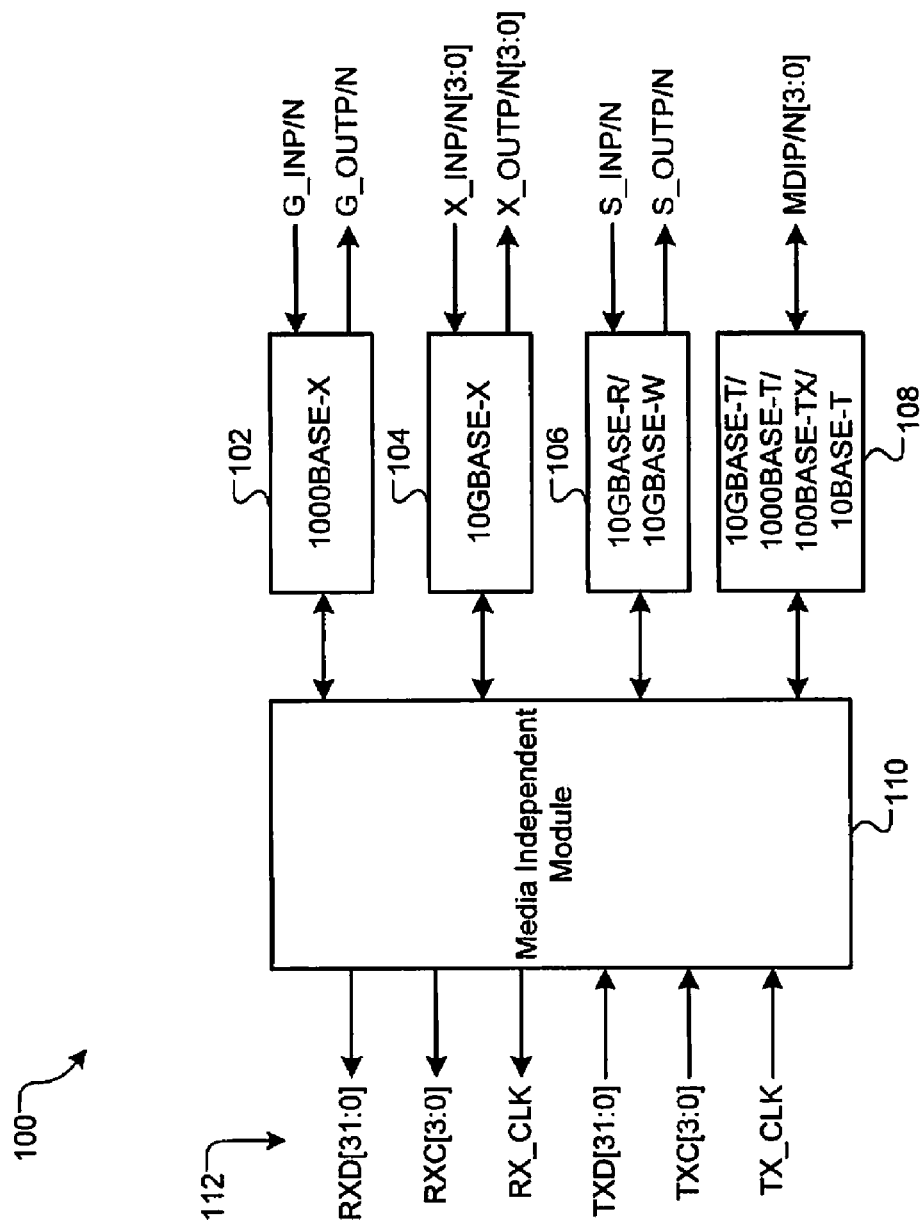
FIG. 2 is a functional block diagram of an exemplary physical layer device (PHY)

Referring now to FIG. 2, an exemplary physical layer device (PHY) 100 is depicted. The exemplary PHY 100 includes N media ports. In this implementation, N is equal to four. The N ports include a fiber 1000BASE-X first port 102, a parallel 10GBASE-X second port 104, a LAN/WAN serial 10GBASE-R/10GBASE-W third port 106, and a copper 10GBASE-T/1000BASE-T/100BASE-TX/10BASE-T fourth port 108. One skilled in the art will recognize that a PHY may have additional or fewer media ports, and the media ports may be of different type.

The media ports 102, 104, 106, and 108 communicate with a media independent module 110. The media independent module 110 provides a media independent interface 112, such as with XGMII/GMII/MII signals, as shown in the exemplary PHY 100. Alternatively, the interface may be a XAUI interface, or an extended XGMII interface, disclosed in "Media And Speed Independent Interface," U.S. patent application Ser. No. 11/114,842, filed Apr. 26, 2005, which is hereby incorporated by reference in its entirety.

Each of the media ports is able to sense when there is energy (or activity) on its physical media. The first media port 102 is shown receiving signal G_INP/N and transmitting G_OUTP/N. The second media port 104 is shown receiving signals X_INP/N[3:0] and transmitting X_OUTP/N[3:0]. The third media port 106 is shown receiving signal S_INP/N and transmitting S_OUTP/N. The fourth media port 108 is shown communicating signals MDIP/N[3:0]. These signals are media and implementation dependent. As described below, the media independent module 110 chooses one media port to connect with the media independent interface 112.

Each of the media ports is capable of sensing whether there is activity (or energy) on its physical medium. This information is communicated to the media independent module 110 in the form of activity signals. Each of the media ports also communicates its network link status to the media independent module 110 in the form of link signals. One skilled in the art will recognize that the activity and link signals may be multiplexed over the same physical connection.

Figure 3:
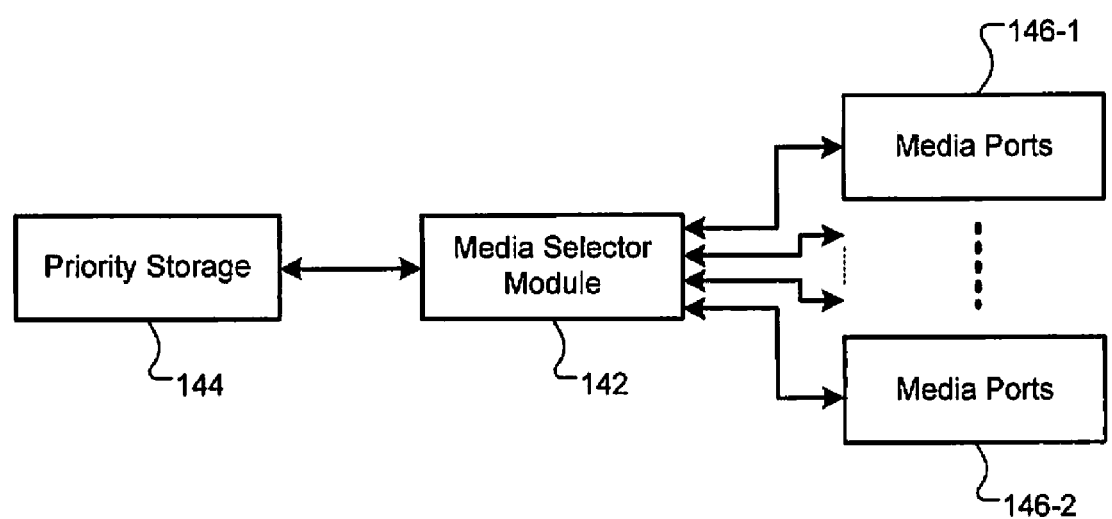
FIG. 3 is a functional block diagram of an exemplary media selection system for a PHY.

Referring now to FIG. 3, a functional block diagram of an exemplary media selection system for a PHY is presented. A media selector module 142 communicates with a priority storage module 144. The media selector module 142 communicates with at least two media ports 146. The priority storage module 144 contains information regarding priority of the media ports 146, i.e., which media port is preferred with respect to other media port for establishing a connection. The priority information assigns a distinct priority to each media port 146, such that a list can be formed with the highest priority media port at the top and the lowest priority media port at the bottom. The media selector module 142 uses the priority information to maintain a link on the highest priority media port 146 that is possible. This priority information may be default or pre-programmed values, or may be set by the end user.

Figure 4:
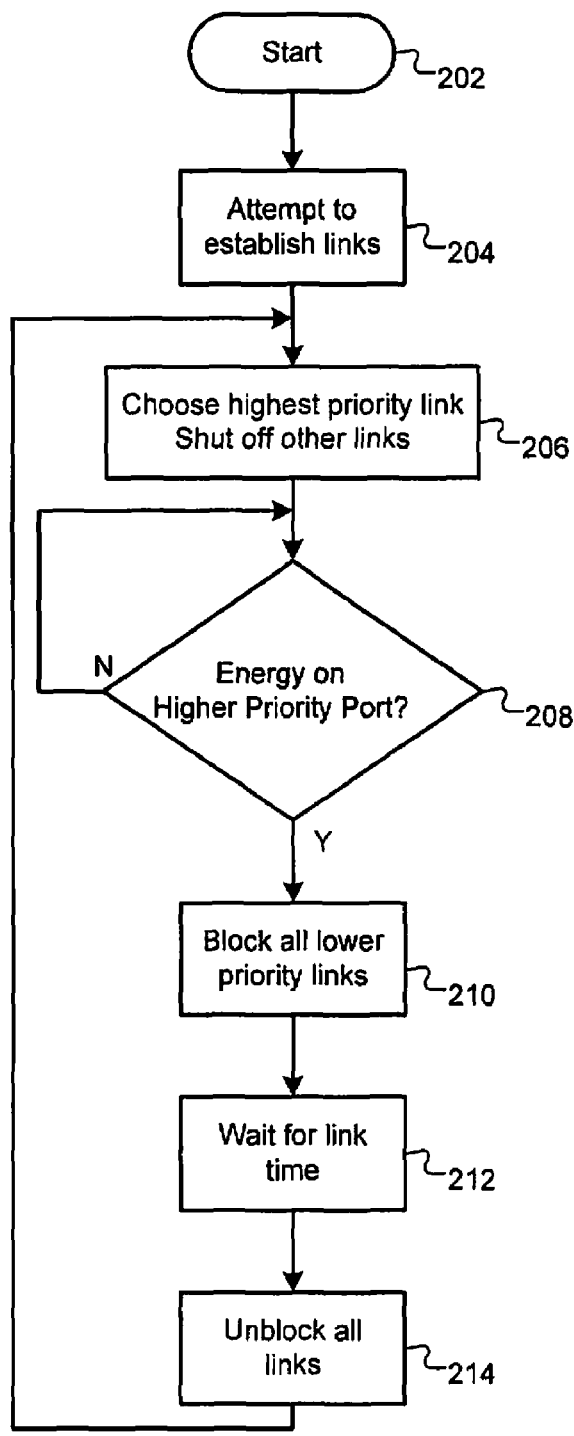
FIG. 4 is a flow chart depicting exemplary steps performed by a media selection system according to the principles of the present invention.

Referring now to FIG. 4, a flow chart depicts exemplary steps taken by the media selector module 142 in determining which media port will be selected. Control starts at step 202 and transfers to step 204. In step 204, control attempts to establish links on all of the media ports. Control then transfers to step 206, where the established link of the highest priority port is chosen and all other links are blocked. Blocked links operate in a minimal power mode, with only a low-power circuit to detect energy on the physical media. Control then transfers to step 208. In step 208, control determines whether energy is sensed on a higher priority port. If so, control transfers to step 210; otherwise, control remains in step 208.

In step 210, ports with a priority below the higher priority port of step 208 are blocked. Optionally, the lower priority port on which a link is currently established can remain on, pending a link being established on the higher priority port of step 208. Power constraints of the PHY 18 may only allow for one link at a time, in which case all lower priority ports will be blocked. In step 212, a timer is set, and upon expiration of the timer, control transfers to step 214. The timer value is set based on the time typically (or alternately, maximally) required for the media of the higher priority port of step 208 to establish a link. In step 214, all links are unblocked and control returns to step 206.

Figure 5:
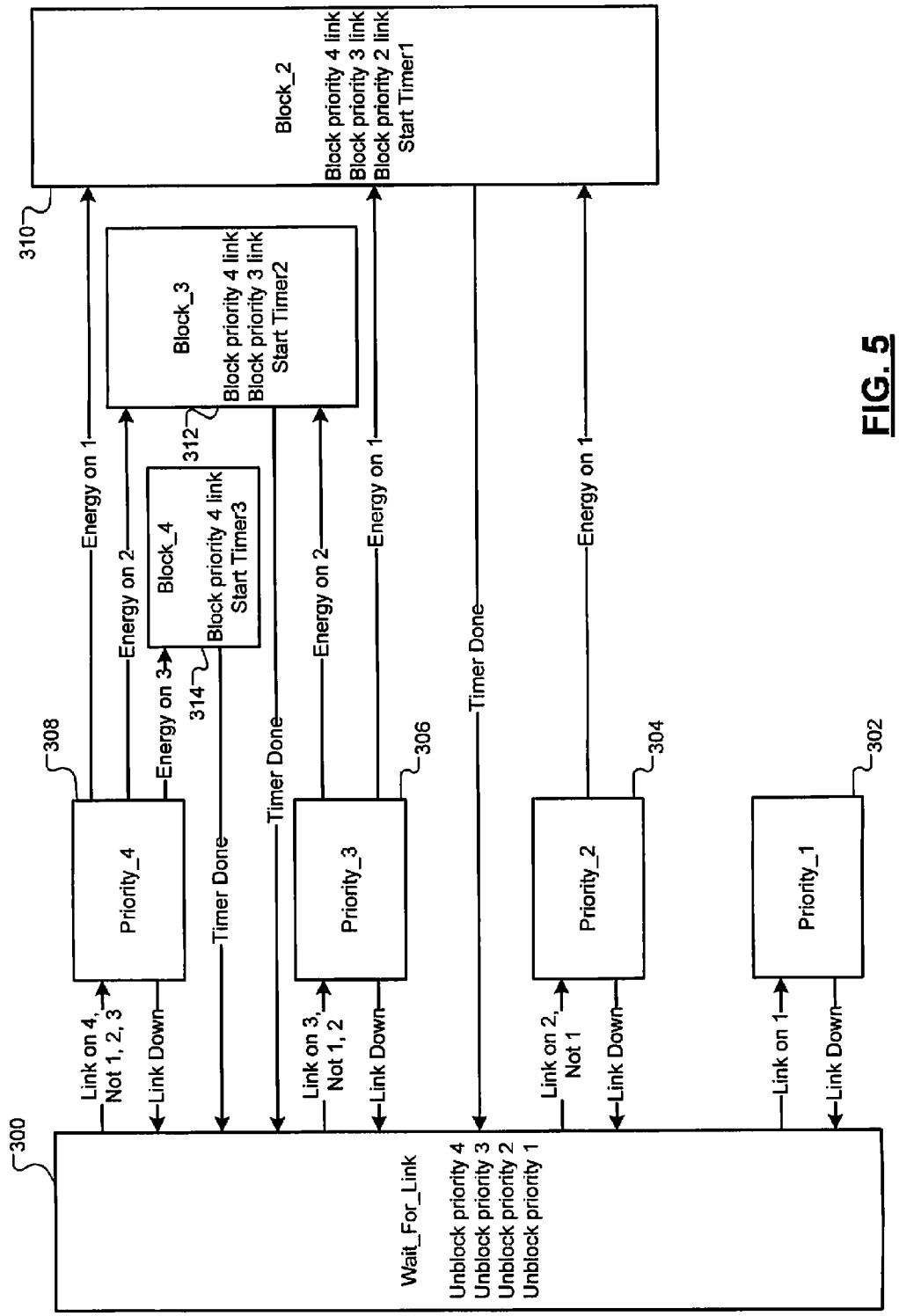
FIG. 5 is an exemplary state diagram of a media selection system according to the principles of the present invention.

Referring now to FIG. 5, a state diagram of an exemplary media selection system according to the principles of the present invention is presented. In this exemplary media selection system, four media ports and therefore four corresponding priority levels are present. Each media port is assigned a distinct priority level. The media port with the highest priority (the most preferable network link) is referred to as port one, the media port with the second highest priority is port two, etc. One skilled in the art will recognize that more or fewer ports may be employed. Control begins in state 300, where all four ports are unblocked and each attempts to establish a link. If a link is established on port one, control transfers to state 302. If no link is established on port one, but a link is established on port two, control transfers to state 304; otherwise, if a link is established on port three, control transfers to state 306; otherwise, if a link is established on port four, control transfers to state 308.

In state 302 ports two through four are blocked. If the established link goes down, control returns to state 300. In state 304 ports one, three, and four are blocked. If the established link goes down, control returns to state 300. If, in state 304, energy is sensed on port one, control transfers to state 310. In state 310 ports two, three, and four are blocked and a timer is started. The timer value is based on the typical (or optionally, maximum expected) time required for a link to be established on the physical media used by port one. When the timer is done, control transfers to state 300. This timed delay gives the (preferred) port one a head start in establishing a link.

In state 306 ports one, two, and four are blocked. If the established link goes down, control returns to state 300. If, in state 306, energy is sensed on port one, control transfers to state 310. Otherwise, if energy is sensed on port two, control transfers to state 312. In state 312 ports three and four are blocked and a timer is started with a value corresponding to port two. When the timer is done, control returns to state 300.

In state 308 ports one through three are blocked. If the established link goes down, control returns to state 300. If energy is sensed on port one, control transfers to state 310. Otherwise, if energy is sensed on port two, control transfers to state 312; otherwise, if energy is sensed on port three, control transfers to state 314. In state 314 port four is blocked and a timer is started with a value corresponding to port three. When the timer is done, control returns to state 300. Selective blocking depends upon power requirements. If the physical layer device can support the power draw of multiple simultaneous links, the port with a currently active link may remain unblocked until the higher priority port has actually established a link.

One skilled in the art will recognize that there are various methods of detecting and qualifying energy. A partial discussion of how to detect energy on physical media is presented in "Ethernet Automatic Media Selection Logic," U.S. patent application Ser. No. 09/991,046, filed Nov. 21, 2001, and "Ethernet Automatic Media Selection Logic With Preferred Medium Selector," U.S. patent application Ser. No. 10/435,301, filed May 9, 2003, which are both hereby incorporated by reference in their entirety.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A media selection system comprising:
  a plurality of media ports, each of the plurality of media ports being coupled to a corresponding physical medium, each of the plurality of media ports being configured to
    generate an activity signal indicting whether activity is sensed on the corresponding physical medium associated with the media port, and
    generate a link status signal indicating a network link status through the corresponding physical medium associated with the media port;
  a priority storage module configured to contain priority information, the priority information setting forth a priority for establishing a link through each of the plurality of media ports; and
  a media selector module configured to
    select a first media port of the plurality of media ports through which a link will be maintained based on the activity signal generated by each of the plurality of media ports, the link signal generated by each of the plurality of media ports, and the priority information, and
    block all other links through media ports of the plurality of media ports other than the first media port.

2. The media selection system of claim 1, wherein the priority information associates each of the plurality of media ports with a unique priority level.

3. The media selection system of claim 1, wherein the priority storage module comprises one or more of an application specific integrated circuit (ASIC), an electronic circuit, a processor, a combination logic circuit, or a memory.

4. The media selection system of claim 1, wherein the first media port has a highest priority among other media ports of the plurality of media ports having an established link.

5. The media selection system of claim 1, wherein the plurality of media ports comprise one or more of a fiber 1000BASE-X port, a parallel 10GBASE-X port, a serial 10GBASE-R/10GBASE-W port, or a copper 10GBASE-T/1000BASE-T/100BASE-TX/10BASE-T port.

6. A media independent module comprising:
   the media selection system of claim 1; and
   a media independent interface configured to connect to the first media port.

7. The media independent module of claim 6, wherein the media independent interface comprises a XAUI interface.

8. The media independent module of claim 6, wherein the media independent interface comprises an extended XGMII interface.

9. A method for selecting a media port from among a plurality of media ports through which a link will be maintained, each of the plurality of media ports being coupled to a corresponding physical medium, the method comprising:
   for each of the plurality of media ports,
   generating an activity signal indicting whether activity is sensed on the corresponding physical medium associated with the media port, and
   generating a link status signal indicating a network link status through the corresponding physical medium associated with the media port;
   selecting a first media port of the plurality of media ports through which a link will be maintained based on the activity signal generated by each of the plurality of media ports, the link signal generated by each of the plurality of media ports, and priority information, wherein the priority information sets forth a priority for establishing a link through each of the plurality of media ports; and
   blocking all other links through media ports of the plurality of media ports other than the first media port.

10. The method of claim 9, wherein the priority information associates each of the plurality of media ports with a unique priority level.

11. The method of claim 9, wherein the first media port has a highest priority among other media ports of the plurality of media ports having an established link.

12. The method of claim 9, wherein the plurality of media ports comprise one or more of a fiber 1000BASE-X port, a parallel 10GBASE-X port, a serial 10GBASE-R/10GBASE-W port, or a copper 10GBASE-T/1000BASE-T/100BASE-TX/10BASE-T port.

* * * * *